3,067,232
S-VINYL PHOSPHOROTHIOATES
Joseph W. Baker, Nitro, W. Va., assignor to Monsanto Chemical Company, St. Louis, Mo., a corporation of Delaware
No Drawing. Filed Aug. 16, 1957, Ser. No. 678,550
7 Claims. (Cl. 260—461)

The present invention relates to new organic compounds of phosphorus and to the methods whereby such products are formed. The invention also relates to the use of the various products within the scope of the claims as effective insecticides.

More particularly, the invention comprises the preparation of products described as vinyl phosphorothioates and dithioates. The products are readily obtained as shown by the various examples that follow, by the addition of a phosphorothioic or dithioic acid wtih acetylene or an acetylenic compound. Although in some instances no catalyst is used, in most cases a catalyst, such as benzoyl peroxide, is employed. It has been found that acetylene and other triple bond compounds add readily to a mercapto group linked to phosphorus. Through this new reaction a valuable class of compounds may be produced in a simple, direct manner. The products are believed to be new compounds.

The vinyl phosphorothioates and dithioates may be formed by selecting reactants from a wide range of organic compounds. For example, as the phosphorus acid reactant there may be employed a compound of the structure

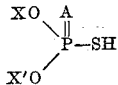

where A represents either oxygen or sulfur and X and X' represent alkyl, alkenyl, aryl or alicyclic radicals which radicals may be substituted, as for example by chlorine, bromine, hydroxy, alkoxy and aryloxy groups. As typical examples of X and X' may be mentioned methyl, ethyl, propyl, butyl isopropyl, isobutyl, amyl, hexyl, octyl, decyl, dodecyl, pentadecyl, 2-ethylhexyl, methoxyethyl, methoxypropyl, ethoxyethyl, chloroethyl, cyclohexyl, phenyl, p-chlorophenyl, 2,4-dichlorophenyl, 2,4-dibromophenyl, allyl and 2-chloroallyl.

Such acids of the general type shown may be reacted as described in the examples hereinafter shown with acetylene itself or with acetylene compound of the general formula MC≡CR wherein M represents hydrogen, alkyl, carboxyl, alkoxycarbonyl, hydroxyalkyl, phenyl, HC≡C—(CH$_2$)$_n$ where $n$ is an integer from 1 to 5 and R represents hydrogen, alkyl, cyclohexyl, hydroxycyclohexyl, hydroxyalkyl, haloalkyl, alkoxycarbonyl, phenyl, dialkylaminoalkyl,

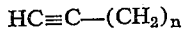

where X, X' and A have the same significance as before. Examples of suitable acetylene compounds comprise the following structures:

CH$_3$C≡CH
CH$_3$(CH$_2$)$_n$C≡CH where $n$ is an integer from 1 to 9

CH$_3$C≡C—CH$_3$
CH$_3$CH$_2$C≡CCH$_2$CH$_3$
CH$_3$(CH$_2$)$_3$C≡C(CH$_2$)$_3$CH$_3$

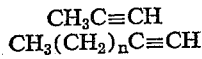

HC≡C(CH$_2$)$_n$C≡CH

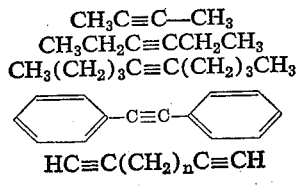

where $n$ is an integer from 1 to 5

CH$_3$C≡CCH$_2$OH

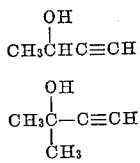

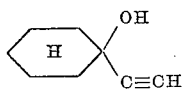

CH$_3$(CH$_2$)$_n$C≡C—CH$_2$OH where $n$ is an integer from 1 to 5

HOOCC≡CCOOH

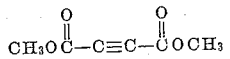

HC≡CCOOH

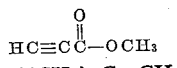

Cl(CH$_2$)$_n$C≡CH where $n$ is an integer from 2 to 5

(C$_2$H$_5$)$_2$NCH$_2$C≡CH
HC≡C—CH$_2$Cl
HC≡C—CH$_2$F
HC≡C—CH$_2$I

As illustrative of the new vinyl phosphorothioates and dithioates and their preparation is the following:

Example 1

A 3-necked flask, fitted with a stirrer, a thermometer, a reflux condenser and means for adding a gas thereto below the surface of the contents, was charged with 186 parts (1 mole) of O,O-diethyl phosphorodithioic acid, approximately 250 parts of benzene and 15 parts of benzoyl peroxide. While the temperature was maintained between 60–80° C. acetylene in an excess over 24 parts (1 mole) was bubbled through over a period of about 60 hours. At the completion of the reaction, the mass was washed with sodium carbonate solution and then with water and was then heated under vacuum at slightly above 80° C. The O,O-diethyl S-vinyl phosphorodithioate so obtained analyzed 16.5% phosphorus as compared with 14.6% for the product of the structure

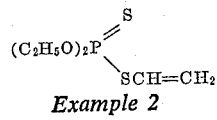

Example 2

Using similar type equipment mentioned in Example 1, 56 parts (1 mole) of propargyl alcohol and 6 parts of benzoyl peroxide together with 400 parts of benzene were charged to the flask and 186 parts (1 mole) of O,O-diethyl phosphorodithioic acid added slowly and the mixture was then heated to refluxing temperature for about 16 hours. Thereupon the entire mass was washed with a sodium carbonate solution followed by washing with water and the volatile materials were removed by heating under vacuum at a temperature of 80–85° C. The O,O-diethyl S-(3-hydroxypropenyl) phosphorodithioate so obtained analyzed 11.5% phosphorus and 27.8% sulfur as compared with 12.8% phosphorus and 26.4% sulfur for the product of the structure

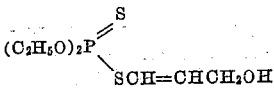

Example 3

As another example of the invention, S,S'-(1-propene-1,3-dithiol) bis(O,O-diethyl phosphorodithioate) was prepared by refluxing for about 20 hours a charge comprising 1 molar portion of O,O-diethyl S-(2-propynyl) phosphorodithioate (described in Joseph W. Baker et al. application Serial No. 576,546, filed April 6, 1956 now U. S. Patent No. 2,865,801) with 1 molar portion of O,O-diethyl phosphorodithioic acid and 15 parts of benzoyl peroxide in about 1200 parts of benzene. The product, isolated as above described, analyzed 15.17% phosphorus as compared with 15.3% for the product of the structure

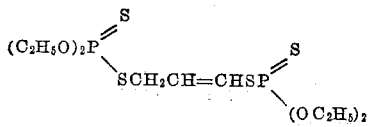

Example 4

The product O,O-diethyl S-(3-hydroxy-3-methyl-1-butenyl) phosphorodithioate was obtained by following the above described procedures in reacting equimolar ratios of O,O-diethyl phosphorodithioic acid with 2-methyl-3-butyn-2-ol in benzene with benzoyl peroxide as the catalyst.

Example 5

The product O,O-diethyl S-[2-(1-hydroxycyclohexyl) vinyl] phophorodithioate was obtained by the reaction of equimolar ratios of O,O-diethyl phosphorodithioic acid and 1-ethynyl cyclohexanol in benzene solution using benzoyl peroxide catalyst.

Example 6

The product O,O-diethyl S-(1-hexenyl) phosphorodithioate was obtained by following the same procedure described in the earlier examples in reacting equimolar ratios of O,O-diethyl phosphorodithioic acid and 1-hexyne in bnezene solution using benzoyl peroxide catalyst. Analysis gase 12.1% phosphorus as compared to 11.5% calculated.

Example 7

Dimethyl (diethoxyphosphinothioylthio)maleate was prepared by adding 1 molar portion of dimethyl acetylenedicarboxylate over a period of time to 1 molar portion of O,O-diethyl phosphorodithioic acid containing a small quantity of triethyl amine. The mixture was heated and the temperature was kept below 60° C. until the strongly exothermic reaction was over, after which the mass was agitated for about 2 hours while maintaining the temperature below 65° C. The mass was then cooled to room temperature and benzene added. The product was washed with a 10% solution of sodium carbonate followed by two washings with water. The benzene was removed by heating to about 110° C. under 20 mm. pressure. Analysis gave 8.4% phosphorus and 18.0% sulfur as compared to 9.4% phosphorus and 20.1% sulfur for the product of the structure

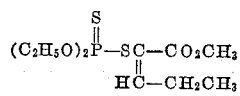

Example 8

As another example of the invention, O,O-diethyl S-(bromopropynyl) phosphorodithioate was obtained by reacting as previously described, in benzene solution containing benzoyl peroxide catalyst, equimolar ratios of propargyl bromide and O,O-diethyl phosphorodithioic acid. The product is represented by the structure

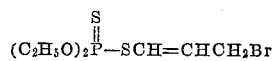

In the following examples ethynylbenzene was reacted in benzene solution and in the presence of a small quantity of a catalyst, such as benzoyl peroxide, with an equimolar proportion of an O,O-diaryl or dialkyl substituted phosphorothioic or dithioic acid. All reactions were carried out as described in the earlier reactions, that is by heating at the solvent refluxing temperature for a number of hours, cooling, washing the mixture with sodium carbonate solution and water and then removing the benzene from the product by distillation at about 100° C. under vacuum. The results obtained are listed below:

Example 9

Reacting with O,O-diethyl phosphorodithioic acid, the product O,O-diethyl S-styryl phosphorodithioate was obtained. The product was an amber colored liquid insoluble in water, soluble in ether, acetone, benzene, heptane, chloroform, ethanol and ethyl acetate. Analysis gave 11.6% phosphorus and 20.7% sulfur as compared to 10.8% phosphorus and 22.2% sulfur for the product of the structure

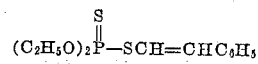

Example 10

In this reaction, O,O-diethyl phosphorothioic acid was employd and the O,O-diethyl S-styryl phosphorothioate so obtained analyzed 10.7% phosphorus as compared to 11.4% for the product of the structure

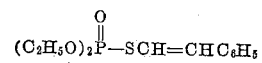

Example 11

In this reaction, O,O-diisopropyl phosphorothioic acid was used and the O,O-diisopropyl S-styryl phosphorothioate so obtained analyzed 9.2% phosphorus as compared to 10.3% for the product of the structure

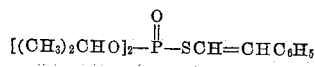

Example 12

In this reaction, O,O-dimethyl phosphorodithioic acid was employed. The O,O-dimethyl S-styryl phosphorodithioate so obtained analyzed 11.8% phosphorus and 26.7% sulfur as compared to 11.9% phosphorus and 24.6% sulfur for the product of the structure

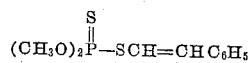

Example 13

In this reaction, O,O-dimethoxyethyl phosphorodithioic acid was used and the O,O-bis(2-methoxyethyl) S-styryl phosphorodithioate so obtained analyzed 9.3% phosphorus and 20.6% sulfur as compared to 8.9% phosphorus and 18.4% sulfur for the product of the structure

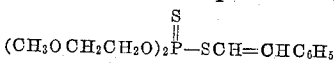

Example 14

In this reaction, O,O-di(2,4-dichlorophenyl)phosphorodithioic acid was employed. The O,O-bis(2,4-dichlorophenyl) S-styryl phosphorodithioate so obtained analyzed 5.4% phosphorus, 12.4% sulfur and 26.7% chlorine as compared to 5.9% phosphorus, 12.3% sulfur and 27.2% chlorine for the product of the structure

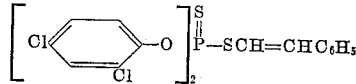

Example 15

In this reaction, O,O-didodecyl phosphorodithioic acid was employed. The O,O-didodecyl S-styryl phosphorodithioate so obtained analyzed 5.1% phosphorus as compared to 5.4% for the product of the structure

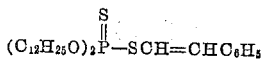

The various products as formed in the examples shown are all yellow to amber colored liquids which exhibit the same characteristics in various solvents as are listed in Example 9.

The products of the present invention were tested in various ways to determine the insecticidal activity of the compounds. Typical of the results obtained are evidenced, for example, by the products of Examples 2 and 9. In residual action effect on filter paper, the product of Example 9 was found to develop a 100% kill of southern army worm larvae and red flour beetle adults. The product of Example 2 in concentration of 0.1% was employed for dipping thereinto leaves of plants infested with two-spotted spider mites. Contact effects were observed on the infested leaves. On the dipped infested plants 100% kill of the mite was obtained in the mobile and resting stages, of the eggs and residual activity also was noted as 100%.

Again, the products of examples 2 and 9 were tested in concentrations of 0.001% against yellow fever mosquito larvae and 100% kill noted on both cases. Also, the compound of Example 9 when tested against yellow fever mosquito larvae in concentration of 0.00002% produced 100% kill while in a concentration as low as 0.000008% caused 20% kill of the larvae.

The new compounds may be employed for destroying a variety of insect pests by contacting the insect in its environment. The compounds may be applied in solution, emulsion, water dispersion, or as a dust formulation wherein the active ingredient is distributed over a dry, free-flowing powder, as for example clays, including bentonite, and attapulgite or such materials as talc, diatomaceous earth, fuller's earth, chalk or calcium carbonate. The required concentrations of active ingredient are small because of the high effectiveness of the new compounds. Sprays for application to agricultural crops may suitably be applied at concentrations of 0.001 to 1.0%. The compounds are also useful adjuvants for compounding mineral oil lubricants in which they have the property of increasing the load carrying capacity.

It is intended to cover all changes and modifications of the examples of the invention herein chosen for purposes of disclosure which do not constitute departures from the spirit and scope of the invention.

What is claimed is:

1. A process which comprises reacting a compound of the structure

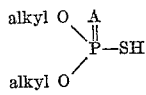

where A is a chalkogen of atomic weight less than 40 with ethynylbenzene.

2. A compound of the structure

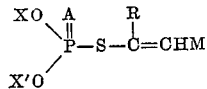

where X and X' represent lower alkyl, A is selected from a group consisting of oxygen and sulfur, R and M represent lower alkoxycarbonyl.

3. A compound of the structure

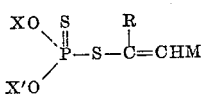

where X and X' represent lower alkyl radicals and M and R represent lower alkoxycarbonyl.

4. A compound of the structure

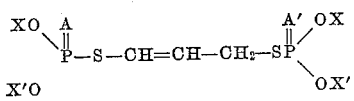

where X and X' represent lower alkyl radicals A and A' represent chalkogens of atomic weight less than 40.

5. Dimethyl (diethoxyphosphinothioylthio)maleate.

6. S,S' - (1 - propene - 1,3 - dithiol)bis(O,O - diethyl phosphorodithioate).

7. A process which comprises reacting equal molar portions of an O,O-di(lower alkyl) S-(2-propynyl)phosphorodithioate and an O,O-di(lower alkyl)phosphorodithioic acid and isolating an addition product.

References Cited in the file of this patent

UNITED STATES PATENTS

| | | |
|---|---|---|
| 2,266,514 | Romieux et al. | Dec. 16, 1941 |
| 2,589,326 | Oberright | Mar. 18, 1952 |
| 2,744,128 | Morris et al. | May 1, 1956 |
| 2,767,206 | Whetstone | Oct. 16, 1956 |
| 2,802,856 | Norman et al. | Aug. 13, 1957 |
| 2,895,982 | Stiles | July 21, 1959 |
| 2,912,450 | McConnell et al. | Nov. 10, 1959 |

OTHER REFERENCES

B.I.O.S. Final Report No. 714, page 63 (1948).

Kastner: "Newer Methods of Preparative Organic Chemistry," (1948), Interscience Publishers, Inc., New York, page 263.